(12) United States Patent
Tan et al.

(10) Patent No.: US 10,818,172 B2
(45) Date of Patent: Oct. 27, 2020

(54) METHOD, DEVICE AND SYSTEM FOR PROCESSING STARTUP OF PRECEDING VEHICLE

(71) Applicant: HANGZHOU HIKVISION DIGITAL TECHNOLOGY CO., LTD., Hangzhou, Zhejiang (CN)

(72) Inventors: Wei Tan, Zhejiang (CN); Fuping Zhang, Zhejiang (CN); Yangwen Huang, Zhejiang (CN); Hu Dai, Zhejiang (CN)

(73) Assignee: HANGZHOU HIKVISION DIGITAL TECHNOLOGY CO., LTD., Hangzhou, Jhejiang (CN)

( * ) Notice: Subject to any disclaimer, the term of this patent is extended or adjusted under 35 U.S.C. 154(b) by 330 days.

(21) Appl. No.: 15/770,280

(22) PCT Filed: Jun. 12, 2016

(86) PCT No.: PCT/CN2016/085438
§ 371 (c)(1),
(2) Date: Apr. 23, 2018

(87) PCT Pub. No.: WO2017/067187
PCT Pub. Date: Apr. 27, 2017

(65) Prior Publication Data
US 2019/0057604 A1 Feb. 21, 2019

(30) Foreign Application Priority Data
Oct. 23, 2015 (CN) .......................... 2015 1 0700316

(51) Int. Cl.
G08G 1/0962 (2006.01)
G08G 1/0965 (2006.01)
(Continued)

(52) U.S. Cl.
CPC ........... *G08G 1/09626* (2013.01); *B60Q 9/00* (2013.01); *B60W 30/17* (2013.01);
(Continued)

(58) Field of Classification Search
CPC ...... G08G 1/09626; G06T 7/248; B60Q 9/00; B60W 30/17; B60W 30/18054; B60W 40/04; B60W 40/10; B60W 40/105
See application file for complete search history.

(56) References Cited

U.S. PATENT DOCUMENTS 6,437,690 B1 * 8/2002 Okezie .................... B60R 25/00
340/505
7,703,213 B2 * 4/2010 Rogers ............... G01B 11/2755
33/203.18

(Continued)

FOREIGN PATENT DOCUMENTS

CN 101223048 A 7/2008
CN 101875348 A 11/2010
(Continued)

OTHER PUBLICATIONS

Huiling et al., Chinese Patent Application Publication No. CN10482768A (translation) (Year: 2015).*
(Continued)

*Primary Examiner* — Hussein Elchanti
(74) *Attorney, Agent, or Firm* — David W. Carstens; James D. Tuck; Carstens & Cahoon, LLP

(57) ABSTRACT

A method, a device and a system for processing startup of a preceding vehicle, wherein, the method for processing startup of a preceding vehicle is applicable to the system for processing startup of a preceding vehicle, the system includes a video sensor and a gravity sensor. The method includes: collecting images in front of a vehicle head of a current vehicle by the video sensor and collecting accelera-
(Continued)

tion information of the current vehicle by the gravity sensor (S102); determining a running state of the current vehicle based on image features in the images in front of the vehicle head and/or the acceleration information (S104); acquiring a movement path of a target object in the images in front of the vehicle head when the running state of the current vehicle is a stationary state (S106); determining whether to generate a reminder for reminding the current vehicle to startup based on the movement path of the target object (S108). The present application solves the problem that it is impossible to give an accurate reminder that the preceding vehicle has started-up during driving, such that when the preceding vehicle of the current vehicle drives out, it can promptly remind the current vehicle to move.

18 Claims, 6 Drawing Sheets

(51) Int. Cl.
*B60W 40/10* (2012.01)
*B60W 50/00* (2006.01)
*B60W 40/105* (2012.01)
*G06K 9/00* (2006.01)
*B60W 30/18* (2012.01)
*B60W 40/107* (2012.01)
*B60W 30/17* (2020.01)
*B60W 50/14* (2020.01)
*B60W 40/04* (2006.01)
*G06T 7/246* (2017.01)
*B60Q 9/00* (2006.01)
*G08G 1/01* (2006.01)
*G08G 1/04* (2006.01)
*G06T 7/70* (2017.01)

(52) U.S. Cl.
CPC ...... *B60W 30/18054* (2013.01); *B60W 40/04* (2013.01); *B60W 40/10* (2013.01); *B60W 40/105* (2013.01); *B60W 40/107* (2013.01); *B60W 50/0098* (2013.01); *B60W 50/14* (2013.01); *G06K 9/00798* (2013.01); *G06K 9/00805* (2013.01); *G06T 7/248* (2017.01); *G08G 1/0133* (2013.01); *G08G 1/04* (2013.01); *G08G 1/0965* (2013.01); *G08G 1/09623* (2013.01); *B60W 2420/42* (2013.01); *B60W 2420/50* (2013.01); *B60W 2520/04* (2013.01); *B60W 2520/105* (2013.01); *F02N 2200/0801* (2013.01); *F02N 2200/125* (2013.01); *G06K 2209/23* (2013.01); *G06T 7/70* (2017.01); *G06T 2207/30241* (2013.01); *G06T 2207/30252* (2013.01)

(56) References Cited

U.S. PATENT DOCUMENTS

| | | | |
|---|---|---|---|
| 9,912,916 | B2* | 3/2018 | Hooton .................. B60R 11/04 |
| 2009/0312933 | A1 | 12/2009 | Hoetzer |
| 2012/0212614 | A1* | 8/2012 | Oszwald .................. B60R 1/00 348/148 |
| 2014/0025252 | A1* | 1/2014 | Lai .......................... G08G 1/205 701/32.4 |
| 2015/0179074 | A1* | 6/2015 | Gupta .................... G08G 1/166 348/148 |
| 2015/0187214 | A1 | 7/2015 | Ichikawa et al. |
| 2015/0210216 | A1* | 7/2015 | Reichel ............... B60W 30/095 701/48 |
| 2017/0228876 | A1* | 8/2017 | Ebiyama .................. G06T 7/11 |

FOREIGN PATENT DOCUMENTS

| | | |
|---|---|---|
| CN | 102022201 A | 4/2011 |
| CN | 202175009 U | 3/2012 |
| CN | 202716801 U | 2/2013 |
| CN | 104508720 A | 4/2015 |
| CN | 104827968 A | 8/2015 |
| CN | 104828088 A | 8/2015 |
| DE | 19942371 A1 | 3/2001 |
| DE | 102014203806 A1 | 9/2015 |
| JP | H09109724 A | 4/1997 |
| JP | 2009500243 A | 1/2009 |
| JP | 2013033312 A | 2/2013 |
| KR | 1344056 B1 | 4/2011 |
| WO | WO 0139120 A2 | 5/2001 |

OTHER PUBLICATIONS

Li Yi, et al.; An Improved Method for Motion Detection by Frame Difference and Background Subtraction; State Key Laboratory for Novel Software Technology, Nanjing University, Nanjing 210093.
Machine Translation of DE102014203806.
CN 104827968 A—Machine Translation.
CN 202175009 U—Machine Translation.
CN 104508720 A—Machine Translation.
CN 102022201 A—Machine Translation.
KR 1344056 B1—Machine Translation.
Machine Translation of Chinese Patent No. CN101223048A.
Machine Translation of Chinese Patent No. CN101875348A.
Machine Translation of Chinese Patent No. CN104828088A.
Machine Translation of Chinese Patent No. CN202716801A.
Machine Translation of German Patent No. DE19942371 (A1).
Machine Translation of Japanese Patent No. JP2009500243A.
Machine Translation of Japanese Patent No. JP2013033312A.
Machine Translation of Japanese Patent No. JPH09109724 (A).

* cited by examiner

METHOD, DEVICE AND SYSTEM FOR PROCESSING STARTUP OF PRECEDING VEHICLE

The present application claims the priority to a Chinese Patent Application No. 201510700316.6, filed with the State Intellectual Property Office of the People's Republic of China on Oct. 23, 2015 and entitled "METHOD, DEVICE AND SYSTEM FOR PROCESSING STARTUP OF PRECEDING VEHICLE", which is incorporated herein by reference in its entirety.

TECHNICAL FIELD

The present application relates to the field of driver assistant system, in particular to a method, a device and a system for processing startup of a preceding vehicle.

BACKGROUND

At a traffic intersection, when a traffic light turns from a red light to a green light or turns from red to green, a preceding vehicle has driven out but the vehicles behind fail to follow up timely due to various reasons, which may lead to a traffic jam and even traffic accidents in severe cases. In the prior art, whether the current vehicle needs to be started-up is generally determined based on running states of front and current vehicles. But in the prior art, a large error exists in the result of the running state of the current vehicle determined by a gravity sensor, a CAN bus or GPS, and whether the preceding vehicle is moving is determined by analyzing the dimensional change of the tail image of a preceding vehicle and supplementing acoustic waves, lasers and other technical means, this technical means for determining whether the preceding vehicle is started-up requires many parameters, the data processing is complicated and the processing result is inaccurate. From above analysis, in the prior art, running states of current and preceding vehicles cannot be determined accurately, thus it is impossible to give an accurate reminder that the preceding vehicle has started-up.

No effective solutions have been proposed yet to solve the problem that it is impossible to give an accurate reminder that the preceding vehicle has started-up during driving in the prior art.

SUMMARY

Embodiments of the present application provide a method, a device and a system for processing startup of a preceding vehicle, so as to at least solve the technical problem that it is impossible to give an accurate reminder that the preceding vehicle has started-up during driving in the prior art.

In one aspect, embodiments of the present application provide a method for processing startup of a preceding vehicle, wherein the method is applicable in a system for processing startup of a preceding vehicle, the system includes a video sensor and a gravity sensor, the method includes: collecting images in front of a vehicle head of a current vehicle by the video sensor and collecting acceleration information of the current vehicle by the gravity sensor; determining a running state of the current vehicle based on image features in the images in front of the vehicle head and/or the acceleration information; acquiring a movement path of a target object in the images in front of the vehicle head when the running state of the current vehicle is a stationary state; and determining whether to generate a reminder for reminding the current vehicle to startup based on the movement path of the target object.

In another aspect, embodiments of the present application provide a device for processing startup of a preceding vehicle, wherein the device is applicable in a system for processing startup of a preceding vehicle, the system includes a video sensor and a gravity sensor, the device includes: a collection unit, configured for collecting images in front of a vehicle head of a current vehicle by the video sensor and collecting acceleration information of the current vehicle by the gravity sensor; a determination unit, configured for determining a running state of the current vehicle based on image features in the images in front of the vehicle head and/or the acceleration information; an acquisition unit, configured for acquiring a movement path of a target object in the images in front of the vehicle head when the running state of the current vehicle is a stationary state; a generation unit, configured for determining whether to generate a reminder for reminding the current vehicle to startup based on the movement path of the target object.

In another aspect, embodiments of the present application provide a system for processing startup of a preceding vehicle, wherein the system includes: a video sensor installed on a front windshield of a current vehicle, wherein the video sensor is located on the same horizontal line with rear view mirror of the current vehicle and is configured for collecting images in front of the vehicle head of the current vehicle; a gravity sensor configured for acquiring acceleration information of the current vehicle; a processor that is connected to the video sensor and the gravity sensor, and configured for determining a running state of the current vehicle based on image features in the images in front of the vehicle head and/or the acceleration information, acquiring a movement path of a target object in the images in front of the vehicle head when the running state of the current vehicle is a stationary state, and determining whether to generate a reminder for reminding the current vehicle to startup based on the movement path of the target object.

In another aspect, embodiments of the present application provide an application, which is configured for implementing the above method for processing startup of a preceding vehicle when being carried out.

In another aspect, embodiments of the present application provide a storage medium, which is configured for storing an application, wherein the application is configured for implementing the above methods for processing startup of a preceding vehicle when being carried out.

The solutions of the embodiments of the present application include: determining a running state of a current vehicle based on image features in images in front of a vehicle head collected by a video sensor and/or acceleration information collected by a gravity sensor; acquiring a movement path of a target object in the images in front of the vehicle head when the running state of the current vehicle is a stationary state; and determining whether to generate a reminder for reminding the current vehicle to startup based on the movement path of the target object. Based on the above embodiments, the running state of a current vehicle can be accurately determined based on both images in front of the vehicle head and acceleration information. When the running state of the current vehicle is a stationary state, whether the preceding vehicle of the current vehicle starts-up is determined based on the movement path of the target object in the images in front of the vehicle head to determine whether it is needed to generate a reminder. In the solutions, fewer parameters are used in the processing process and the processing result is accurate, so as to solve the problem that it is impossible to give an accurate reminder that the preceding vehicle has started-up during driving in the prior art, such that when the front vehicle of the current vehicle drives out, it can promptly remind the current vehicle to move in time.

BRIEF DESCRIPTION OF THE DRAWINGS

The accompanying drawings are provided for further understanding of the present application as a part thereof. The exemplary embodiments of the present application and the descriptions thereof are provided solely for illustration of the present application and are not limitation thereof. In the drawings.

DETAILED DESCRIPTION

Figure 1:
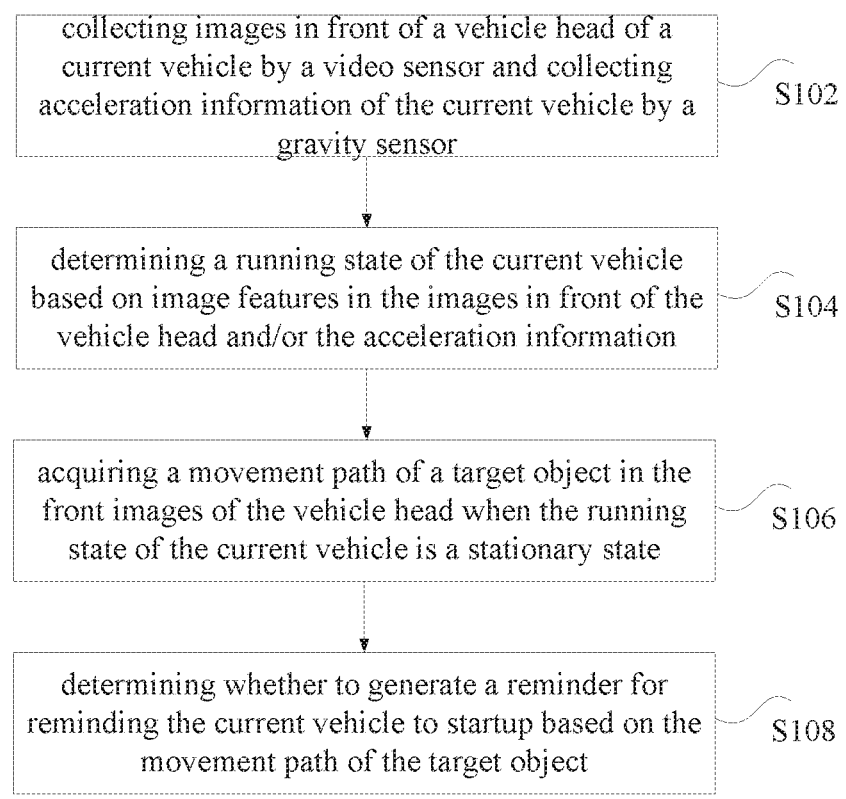
FIG. 1 is a flowchart of a method for processing startup of a preceding vehicle according to an embodiment of the present application.

Firstly, some expressions or terms that are used in the description of embodiments of the present application are explained as follows.

An Advanced Driver Assistant System (ADAS) is used to collect interior and exterior environment data of the vehicle in real time by utilizing a plurality of sensors installed in the vehicle for enable identification, detection and tracking of the static and dynamic object, so that a driver enable to perceive the possible dangers in the shortest time so as to improve the driving safety.

Monocular Vision: is used to acquire scene information using a camera and perform intelligent analysis.

Line Segment Detector: a linear segment detection algorithm through which an accuracy in a subpixel level can be obtained in linear time.

Kalman filter: performs optimal estimation on the system state by using a linear system state equation and through system observation data.

G-sensor: a sensor that is capable of sensing the change of acceleration.

CAN bus: the abbreviation of Controller Area Network (CAN), which is an ISO international standardized serial communication protocol and one of the most widely used field buses in the world.

Vehicle Tail: the tail of a vehicle in an image that is identified by detection and tracking algorithms and represented by a rectangle box, and is the same concept as "vehicle" and "target" herein.

Preceding vehicle: the only vehicle that is identified in front of the vehicle head of a current vehicle in an image, and has the same concept as "front vehicle" herein.

Histogram of Oriented Gradient: a feature descriptor used for object detection in computer vision and image processing, wherein features are constituted by computing and statistically obtaining the histogram of oriented gradient of a local area of an image.

Adaboost: an iterative algorithm, the core idea thereof is to train different weak classifiers for the same training set, and then combine these weak classifiers to form a strong classifier.

For a better understanding of solutions in the present application by a person skilled in the art, the technical solutions in embodiments of the present application will be described clearly and completely below with reference to the accompanying drawings in the embodiments of the present application. Obviously, the described embodiments are only some of the embodiments of the present application, rather than all of the embodiments. All other embodiments obtained based on the embodiments of the present application by those skilled in the art without any creative work shall fall into the protection scope defined by the present application.

It should be noted that the terms such as "first", "second" and the like in the description, claims and the accompanying drawings of the present application are used to distinguish similar objects, and are not necessarily used to describe a specific order. It should be understood that data used in this way can exchange in appreciate situations, so that embodiments of the present application described herein can be implemented in an order other than those illustrated or described herein. Moreover, the terms "comprise", "include" and any variants thereof are intended to cover a non-exclusive inclusion, e.g., processes, methods, systems, products or devices including a series of steps or units are not limited to those steps or units specifically listed, but also include other steps or units not specifically listed or intrinsic to these processes, methods, products, or devices.

Embodiment 1

Embodiments of the present application provide a method for processing startup of a preceding vehicle. It should be noted that the steps illustrated in the flowcharts of the drawings can be performed in a computer system with a set of computer executable instructions, and although logic orders are illustrated in the flowcharts, the steps illustrated or described can be performed in an order other than those orders herein.

FIG. 1 is a flowchart of a method for processing startup of a preceding vehicle according to an embodiment of the present application. As shown in FIG. 1, the method for processing startup of a preceding vehicle is applicable to a system for processing startup of a preceding vehicle, the system includes a video sensor and a gravity sensor, and the method can include the following steps:

S102, collecting images in front of a vehicle head of a current vehicle by the video sensor and collecting acceleration information of the current vehicle by the gravity sensor.

S104, determining a running state of the current vehicle based on image features in the images in front of the vehicle head and/or the acceleration information.

Wherein, the running state of the current vehicle can be a stationary state or a moving state, the stationary state refers to a state where the current vehicle is stationary relative to the road surface, e.g., when waiting for traffic lights or in traffic jams; the moving state refers to a state where the current vehicle is moving relative to the road surface, including acceleration, deceleration, uniform motions.

Step S106, acquiring a movement path of a target object in the images in front of the vehicle head when the running state of the current vehicle is a stationary state.

Wherein, there can be one or more target objects in the images in front of the vehicle head.

S108, determining whether to generate a reminder for reminding the current vehicle to startup based on the movement path of the target object.

In the embodiment of the present application, the method for processing startup of a preceding vehicle includes: determining a running state of a current vehicle based on image features in images in front of a vehicle head collected by a video sensor and/or acceleration information collected by a gravity sensor; acquiring a movement path of a target object (including the preceding vehicle) in the images in front of the vehicle head when the running state of the current vehicle is a stationary state; and determining whether to generate a reminder for reminding the current vehicle to startup based on the movement path of the target object. Based on the above embodiment, the running state of a current vehicle can be accurately determined based on the combination of image information in front of the vehicle head and acceleration information. When the running state of the current vehicle is a stationary state, whether the preceding vehicle of the current vehicle starts-up is determined based on the movement path of the target object in the images in front of the vehicle head to determine whether it is needed to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

In the above embodiment, successive images can be captured for an area in front of the vehicle head of the current vehicle in real time by a camera installed on a windshield behind rear view mirrors of the current vehicle to acquire images in front of the vehicle head of the current vehicle. The gravity sensor acquires acceleration information of the current vehicle in real time, which includes acceleration values of the current vehicle in three different directions in a world coordinate system, wherein, the three different directions mentioned above are the running direction of the vehicle, a direction perpendicular to the running direction of the vehicle and parallel to the road surface, and a direction perpendicular to the road surface respectively.

The running state of the vehicle can be determined more accurately by acquiring the images in front of the vehicle head and the acceleration information without modifying vehicle lines than the solution that the running state of the vehicle is only determined by a gravity sensor.

Optionally, there can be one camera in the above embodiment, successive images are captured for an area in front of the vehicle head of the current vehicle in real time by one camera, and acceleration information of the current vehicle is acquired by a gravity sensor. The running state of the current vehicle is determined based on image features in the images in front of the vehicle head and/or the acceleration information. If the determined running state of the current vehicle is the stationary state, acquire the movement paths of one or more target objects in the images in front of the vehicle head, and determine whether the preceding vehicle of the current vehicle has driven out based on the movement paths of one or more target objects, and if the preceding vehicle has driven out but the current vehicle is still in a stationary state, then generate a reminder.

Embodiments of the present application will be described in detail below in an application scenario where the current vehicle is running at a traffic intersection.

A camera is installed on a windshield behind rear view mirrors of a vehicle that is currently running. If the current vehicle runs to the traffic intersection and the traffic light of the traffic intersection is red, then the current vehicle stops and the processing method starts. After the algorithm is started, a plurality of continuous frames are captured for an area in front of the current vehicle by a camera, and acceleration information of the current vehicle in three different directions is acquired by a gravity sensor. The running state of the current vehicle is determined as in a stationary state based on image features in the images in front of the vehicle head and/or acceleration values in the acceleration information, track the movement path of the target object in the images in front of the vehicle head, if it is determined that the front vehicle of the current vehicle drives out based on the movement path of the target object, generate a reminder for reminding the current vehicle to startup and output this reminder by a prompting device to remind the current vehicle to startup in time.

Based on the above embodiment, the current vehicle can automatically and accurately determine that the front vehicle is driving out and starts-up to follow it when the color of a traffic light changes.

In the above embodiment of the present application, determining a running state of the current vehicle based on image features in the images in front of the vehicle head and/or the acceleration information includes: determining whether the running state of the current vehicle is a stationary state or a moving state based on frame difference foreground ratios of N successive frames of images in front of the vehicle head and/or the acceleration information of the current vehicle when the running state of the current vehicle is an initial state; determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state. Wherein, the image features in the images in front of the vehicle head comprise the frame difference foreground ratios and the frame difference foreground dispersions.

Wherein, image features in the images in front of the vehicle head include the frame difference foreground ratios and the frame difference foreground dispersions, wherein the frame difference foreground ratio refers to the ratio of the number of frame difference foreground points to the number of pixels of an image, and is used to measure the proportion of targets moving relative to the vehicle in a scene, the frame difference foreground dispersion refers to the ratio of the area of foreground blocks to the number of pixels of an image, and is used to measure the dispersion level of foreground scenes to distinguish frame differences caused by a stationary object and a moving object. Wherein, the foreground block is a rectangular block obtained by performing erosion, expansion, and connected domain processing on frame difference foreground points.

It can be understood that relative movements may exist between the current vehicle and stationary objects in the current scene, such as road surfaces, buildings, railings, and moving objects in the current scene, such as vehicles and pedestrians. Thus, the frame difference may be obtained by processing adjacent frames of images in front of the vehicle head using an image frame difference algorithm. Frame difference characteristics of a vehicle in a moving state and a vehicle in a stationary state are different. For a vehicle in a moving state, the frame difference is mainly caused by the relative movement between the vehicle and stationary objects in the scene. In this case, the frame difference foreground ratio is relatively large, and so is the frame difference foreground dispersion. However, for a vehicle in a stationary state, the frame difference is mainly caused by the relative movement between the vehicle and other vehicles or pedestrians. Thus, the frame difference foreground ratio and the frame difference foreground dispersion are relatively small. Thus, it is possible to determine whether the running state of the current vehicle is a stationary state or a moving state based on frame difference foreground ratios and/or frame difference foreground dispersions of N successive frames of images in front of the vehicle head in combination with the acceleration information of the current vehicle.

The acceleration information acquired by the gravity sensor in the above embodiment includes acceleration values, which can accurately reflect whether the current vehicle is in an acceleration or deceleration state. When the current vehicle starts-up or stops, the acceleration value is larger, and when the current vehicle is moving at a constant speed or still at rest, the acceleration value is smaller.

In the above embodiment, frame difference foreground dispersion features of scenes in front of a vehicle are used when determining the running state of the current vehicle, which can remove the interference of a vehicle in a neighboring lane to the determination of the running state of the current vehicle.

Based on the above embodiment, the running state of the current vehicle is determined based on image features in images in front of a vehicle head and/or acceleration information of the current vehicle, so as to accurately determine the running state of the current vehicle.

Specifically, determining whether the running state of the current vehicle is a stationary state or a moving state based on frame difference foreground ratios of N successive frames of images in front of the vehicle head and/or the acceleration information of the current vehicle when the running state of the current vehicle is an initial state includes: determining the running state of the current vehicle is the moving state if the frame difference foreground ratios of N successive frames of images in front of the vehicle head are larger than a preset ratio threshold or the acceleration value of the current vehicle corresponding to each of the images in front of the vehicle head in N successive frames of images of images in front of the vehicle head is larger than a preset acceleration threshold, wherein, the acceleration information comprises the acceleration value; determining the running state of the current vehicle is the stationary state if the frame difference foreground ratios of N successive frames of images in front of the vehicle head are not larger than the preset ratio threshold and the acceleration value of the current vehicle corresponding to each of the images in front of the vehicle head in N successive frames of images in front of the vehicle head is not larger than the preset acceleration threshold.

Wherein, the acceleration value is acceleration information collected by a gravity sensor.

Further, determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state includes: when the running state of the current vehicle is the moving state, determining that the running state of the current vehicle changes to the stationary state if the acceleration value of the current vehicle corresponding to each of the images in front of the vehicle head in N successive frames of images in front of the vehicle head is not larger than the preset acceleration threshold and the frame difference foreground ratios of N successive frames of images in front of the vehicle head are not larger than the preset ratio threshold; or determining that the running state of the current vehicle changes to the stationary state if the acceleration value of the current vehicle corresponding to each of the images in front of the vehicle head in N successive frames of images in front of the vehicle head is not larger than the preset acceleration threshold and frame difference foreground dispersions of N successive frames of images in front of the vehicle head are not larger than the preset dispersion threshold, otherwise, it is determined that the running state of the current vehicle remains in a stationary state.

Optionally, the preset acceleration threshold can be represented by $T_g$, the preset ratio threshold can be represented by $T_f$, and the preset dispersion threshold can be represented by $T_s$.

Optionally, in this embodiment, a plurality of continuous frames of images are captured for an area in front of the vehicle head of the current vehicle in real time by the video sensor (e.g., the camera mentioned above) to obtain image information of an area in front of the vehicle head of the current vehicle, acceleration information of the current vehicle is acquired by the gravity sensor and then the running state of the current vehicle is determined based on the image information of the area in front of the vehicle head and the acceleration information.

In this embodiment, the running state of the current vehicle can be determined using a state machine model, the state machine model specifically includes three states, i.e., an initial state, a moving state and a stationary state. The initial state refers to a state, when the system is started, the running state of the current vehicle cannot be determined by the system since the number of frames of the collected images in front of the vehicle head fails to reach a minimum frame number threshold set by the system, and at the moment, the running state of the current vehicle is set as the initial state. The moving state refers to a state when the current vehicle is moving relative to the road surface, including acceleration, deceleration and uniform motions. The stationary state refers to a state when the current vehicle is stationary relative to the road surface, e.g., when waiting for traffic lights or in traffic jams.

The above system refers to a system for implementing the method for processing startup of a preceding vehicle.

Figure 2:
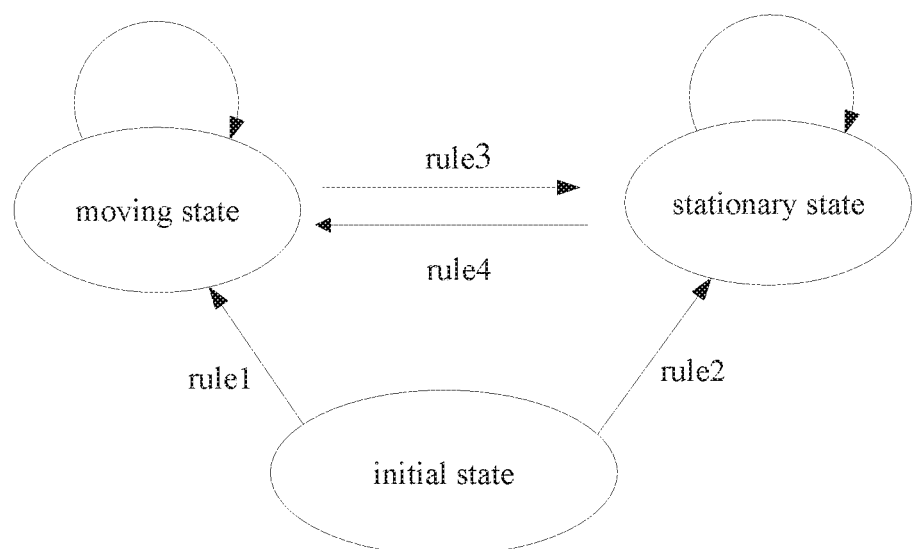
FIG. 2 is a flowchart of an optional method for processing startup of a preceding vehicle according to an embodiment of the present application.

Optionally, a state machine model is shown in FIG. 2, switching between three states of the state machine model can be realized using image features in images in front of a vehicle head of a current vehicle and acceleration information acquired by a gravity sensor.

When the system is just started, the running state of the current vehicle is an initial state. When the number of frames of the collected images in front of the vehicle head reaches the minimum frame number threshold set by the system, whether the running state of the current vehicle is the stationary state or the moving state is determined based on frame difference foreground ratios of N successive frames of images in front of the vehicle head of the current vehicle and/or acceleration information of the current vehicle, i.e., the running state of the current vehicle is determined according to rules 1 or 2 as in FIG. 2.

Specifically, if the acceleration value of the current vehicle corresponding to each of the images in front of the vehicle head in N frames of images in front of the vehicle head of the current vehicle exceeds the preset acceleration threshold $T_g$, or the frame difference foreground ratio of the current vehicle corresponding to each of the images in front of the vehicle head is larger than the preset ratio threshold $T_f$, the running state of the current vehicle is determined as in the moving state, as indicated by rule 1 in FIG. 2.

If the acceleration value of the current vehicle corresponding to each of the images in front of the vehicle head in N frames of images in front of the vehicle head of the current vehicle is smaller than the preset acceleration threshold $T_g$, and the frame difference foreground ratio of the current vehicle corresponding to each of the images in front of the vehicle head is smaller than the preset ratio threshold $T_f$, the running state of the current vehicle is determined as in the stationary state, as indicated by rule 2 in FIG. 2.

When the running state of the current vehicle is determined as in the stationary state or the moving state, the current running state of the current vehicle can be determined according to rules 3 and 4 shown in FIG. 2. Specifically:

Rule 3, when the running state of the current vehicle is the moving state, changing the running state of the current vehicle to the stationary state if the acceleration value of the current vehicle corresponding to each of the images in front of the vehicle head in N successive frames of images in front of the vehicle head is smaller than a preset acceleration threshold $T_g$ and frame difference foreground ratios of N successive frames of images in front of the vehicle head are smaller than a preset ratio threshold $T_f$; or if the acceleration value of the current vehicle corresponding to each of the images in front of the vehicle head in N successive frames of images in front of the vehicle head is smaller than a preset acceleration threshold $T_g$, and frame difference foreground dispersions of N successive frames of images in front of the vehicle head are smaller than a preset dispersion threshold $T_s$, otherwise, maintaining the current vehicle in the stationary state.

Rule 4: when the running state of the current vehicle is the stationary state, changing the running state of the current vehicle to the moving state if the acceleration value of the current vehicle corresponding to each of the images in front of the vehicle head in N successive frames of images in front of the vehicle head is larger than a preset acceleration threshold $T_g$, otherwise, maintaining the current vehicle in the stationary state.

Based on the above embodiment, the running state of the current vehicle can be accurately determined using a state machine model.

According to the above embodiments of the present application, acquiring a movement path of a target object in the images in front of the vehicle head when the running state of the current vehicle is a stationary state includes: performing vehicle tail detection on the images in front of the vehicle head to obtain one or more target objects in the images in front of the vehicle head; and performing target tracking on each of the detected target objects to obtain the movement path of each of the target objects.

Specifically, performing vehicle tail detection on the images in front of the vehicle head includes: performing vehicle tail detection on the images in front of the vehicle head using different vehicle tail detection models during different detection time periods.

Optionally, determining whether to generate a reminder for reminding the current vehicle to startup based on the movement path of the target object includes: determining whether a front vehicle of the current vehicle is moving based on the movement path of each of target objects; generating a reminder for reminding the current vehicle to startup if the front vehicle of the current vehicle is moving, wherein, the front vehicle is a vehicle that is running in the same lane as the current vehicle and is located on front of the vehicle head of the current vehicle.

In the above embodiments, when the running state of the current vehicle is the stationary state, obtain the movement paths of one or more target objects based on vehicle tail detection and target tracking, and then determine, based on the movement paths of one or more target objects, whether the preceding vehicle of the current vehicle has driven out; if the preceding vehicle of the current vehicle has driven out and the current vehicle is still in the stationary state, generate a reminder to remind the current vehicle to move in time.

Figure 3:
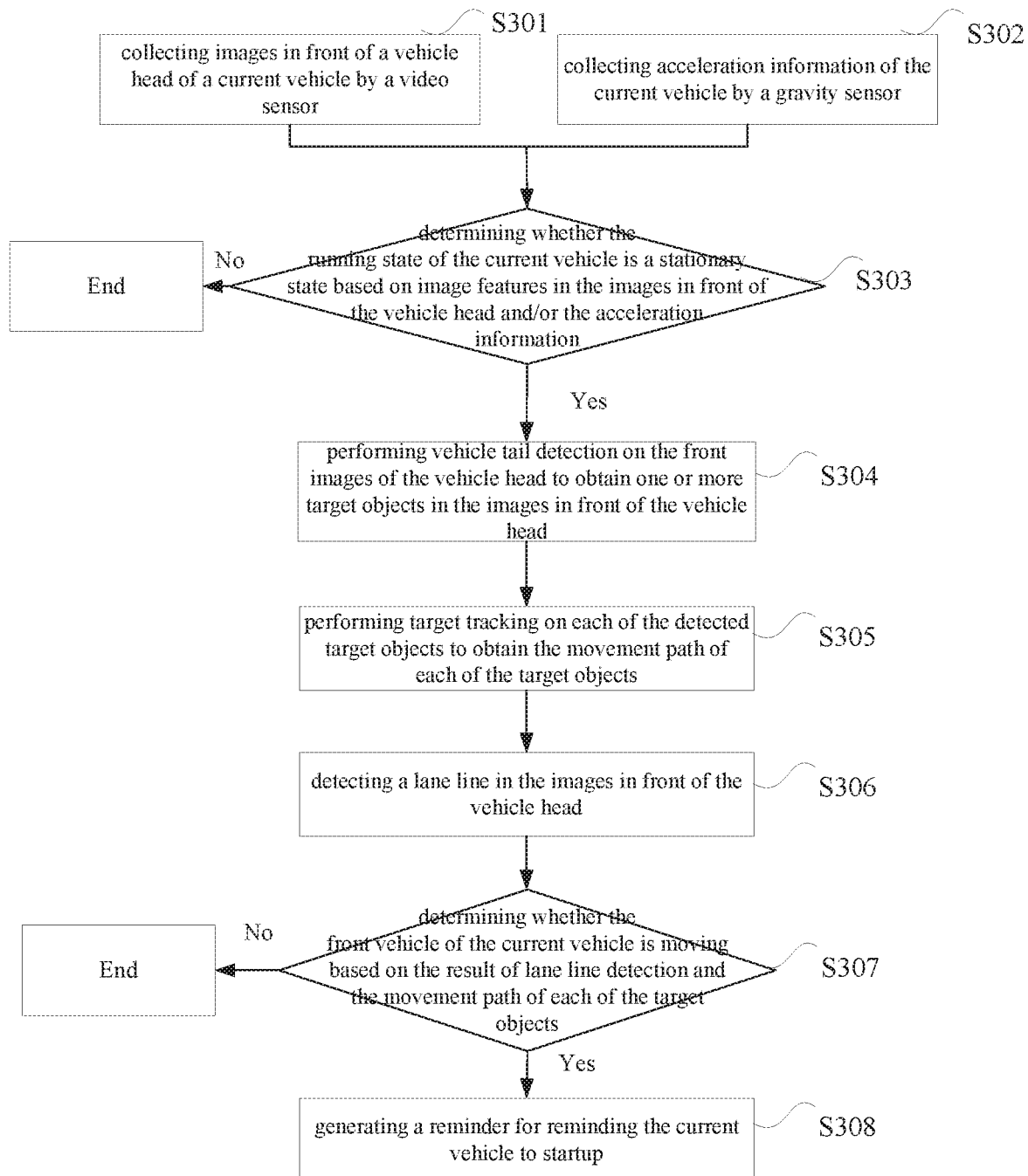
FIG. 3 is a flowchart of another optional method for processing startup of a preceding vehicle according to an embodiment of the present application.

The above embodiment of the present application will be described in detail below in conjunction with FIG. 3. As shown in FIG. 3, this embodiment can be implemented by the following steps:

S301: collecting images in front of a vehicle head of a current vehicle by a video sensor.

S302: collecting acceleration information of the current vehicle by a gravity sensor.

Specifically, successive images can be captured in real time for an area in front of the vehicle head of the current vehicle in real time by one camera, and the acceleration information of the current vehicle in three different directions is acquired by a gravity sensor.

S303: determining whether the running state of the current vehicle is the stationary state based on image features in the images in front of the vehicle head and/or the acceleration information;

if the running state of the current vehicle is determined as the stationary state, performing step S304; otherwise, finishing the reminding algorithm.

S304: performing vehicle tail detection on the images in front of the vehicle head to obtain one or more target objects in the images in front of the vehicle head;

optionally, when the running state of the current vehicle is the stationary state, performing vehicle tail detection on the current frame of the images in front of the vehicle head of the current vehicle collected by a camera, when the running state of the current vehicle is the moving state, stopping vehicle tail detection.

In this embodiment, the vehicle tail detection adopts an off-line learning method to train two vehicle tail models of two detection time periods (such as day and night detection periods) respectively, wherein the vehicle tail model is obtained by extracting HOG features of vehicle tail samples and training with the Adaboost algorithm. During vehicle tail detection, when in the daytime, a daytime vehicle tail model obtained by training is used, and at night, it is adaptively switched to a night vehicle tail model, which enables to use different models in different time periods and ensures the application of the method for processing startup of a preceding vehicle at night.

Optionally, during vehicle tail detection, a specific scale factor is used for down sampling the images in front of the vehicle head to obtain a down sampled image (optionally, corresponding thumbnails are generated from the down sampled images, which improves the processing speed of the system), each down sampled image is scanned by a sliding window to calculate the match degree between each sliding window image and the trained vehicle tail model, a window with the highest match degree is output as a target object to obtain one or more target objects in the images in front of the vehicle head, and target tracking is performed on the obtained one or more target objects. Wherein, the specific scale factor can be set in advance.

S305: performing target tracking on each of the detected target objects to obtain the movement path of each of the target objects.

Wherein, the target tracking enables to track a plurality of target objects at the same time using a color-based target tracking algorithm ColorCSK. The ColorCSK algorithm takes colors as image features and achieves fast correlation matching using the frequency domain. This algorithm includes two parts, i.e., model establishment and match tracking: during model establishment, positions of vehicle tails of target objects are taken as training samples, and target model parameters in the frequency domain are updated according to expected response; during match tracking, correlation matching is performed on a target object using the existing vehicle tail model to find and output the position with the highest response as the track position of the target object in the current image.

Optionally, during target tracking, due to the fact that the distance between the same target object and the current vehicle is different, the size of the image formed in different images can be different, the ColorCSK algorithm allows for scale adapting, in which multiple tracking models can be maintained to stably and continuously track one target object (e.g., a vehicle) to obtain the tracking path of each of the target objects.

When the running state of the current vehicle is the moving state, stop target tracking.

S306: detecting a lane line in the images in front of the vehicle head;

detecting the presence of a lane line and the position of the lane line in the image, if any.

S307: determining whether a front vehicle of the current vehicle is moving based on the result of the lane line detection and the movement path of each of target objects;

determining whether the target object is a target in a neighboring lane based on the relative position between the target object and the lane line, to eliminate incorrect reminder for the current vehicle caused by startup of a vehicle in a neighboring lane;

if the front vehicle of the current vehicle moves, performing S308; otherwise, finishing the prompt procedure.

S308: generating a reminder for reminding the current vehicle to startup.

Determining whether a front vehicle of the current vehicle is moving based on the movement path of each of target objects in the above embodiments of the present application includes: determining a running direction of each of the target objects based on the movement path of each of the target objects; determining whether the target objects are candidate targets that are moving based on the running directions of the target objects and lengths of the movement paths to obtain a candidate target queue; determining whether each of the candidate targets in the candidate target queue is a target in a neighboring lane, wherein a target in a neighboring lane is a target that is running in a different lane from the current vehicle; if the candidate target is a target in a neighboring lane, deleting the target in a neighboring lane from the candidate target queue to obtain an updated candidate target queue; determining whether a candidate target in the updated candidate target queue is the front vehicle of the current vehicle; determining the front vehicle of the current vehicle is moving if the candidate target in the updated candidate target queue is the front vehicle of the current vehicle.

Specifically, when the running state of the current vehicle is the stationary state, obtain movement paths of one or more target objects by vehicle tail detection and target tracking, determine the running direction (turn or straight) of each of the target objects based on the movement path of each of the target objects, and then determine whether the target object is a candidate target that is moving using the movement path of the target object and a preset judging condition corresponding to the running direction to obtain a candidate target queue, determine whether each of the candidate targets in the candidate target queue is running in the same lane as the current vehicle, and if not, the candidate target is a target in a neighboring lane, then delete this candidate target from the candidate target queue to obtain an updated candidate target queue, and then determine whether the candidate target in the updated candidate target queue is the front vehicle of the current vehicle, if it is the front vehicle of the current vehicle, it is determined that the front vehicle of the current vehicle is moving, then generate a reminder for reminding the current vehicle to startup, wherein the front vehicle refers to a vehicle that is running in the same lane as the current vehicle and is in front of the vehicle head of the current vehicle.

Based on the above embodiments, whether the front vehicle of the current vehicle is moving is determined based on the movement path of each of the target objects, and if so, generate a reminder for reminding the current vehicle to startup to prompt the current vehicle to move in time.

Specifically, determining a running direction of each of the target objects based on the movement path of each of the target objects includes: if the curvature of the fitted curve of the movement path of a target object is larger than a preset curvature threshold value, the running direction of the target object is determined to be turning; and if the curvature of the fitted curve of the movement path of a target object is not larger than the preset curvature threshold value, the running direction of the target object is determined to be straight Determining whether the target objects are candidate targets that are moving based on the running directions of the target objects and lengths of the movement paths includes: determining a target object as a candidate target that is moving if the running direction of the target object is turning and the length of the movement path of the target object is larger than a first preset length threshold; determining a target object as a candidate target that is moving if the running direction of the target object is straight and the length of the movement path of the target object is larger than a second preset length threshold.

Optionally, the preset curvature threshold can be represented by T, the first preset length threshold can be represented by L1 and the second preset length threshold can be represented by L2.

Optionally, the movement path is updated based on detection and tracking results of one or more target objects obtained by performing vehicle tail detection and target tracking on each frame of image. First, determine the running direction of each of the target objects based on the movement path of each of the target objects (straight or turning). If the curvature of the fitted curve of the movement path of the target object is larger than a preset curvature threshold T, the running direction of the target object is determined to be turning; and if the curvature of the fitted curve of the movement path of the target object is smaller than T, the running direction of the target object is determined to be straight. For a target object whose running direction is turning, if the length of a corresponding movement path is larger than a first preset length threshold L1 (in pixels), the target object is determined as a candidate target that is moving, then add this target object into the candidate target queue; for a target object whose running direction is straight, if the length of a corresponding movement path is larger than a second preset length threshold L2 (in pixels), the target object is determined as a candidate target that is moving, then add this target object into the candidate target queue. If the movement path is too short and there is no candidate target that conforms to the conditions, directly quit and then update the movement path of the next frame of image.

Based on the above embodiments, it is possible to determine whether the front vehicle of the current vehicle is moving and generate, when the front vehicle is moving, a reminder for reminding the current vehicle to startup to remind the current vehicle to move in time.

Figure 4:
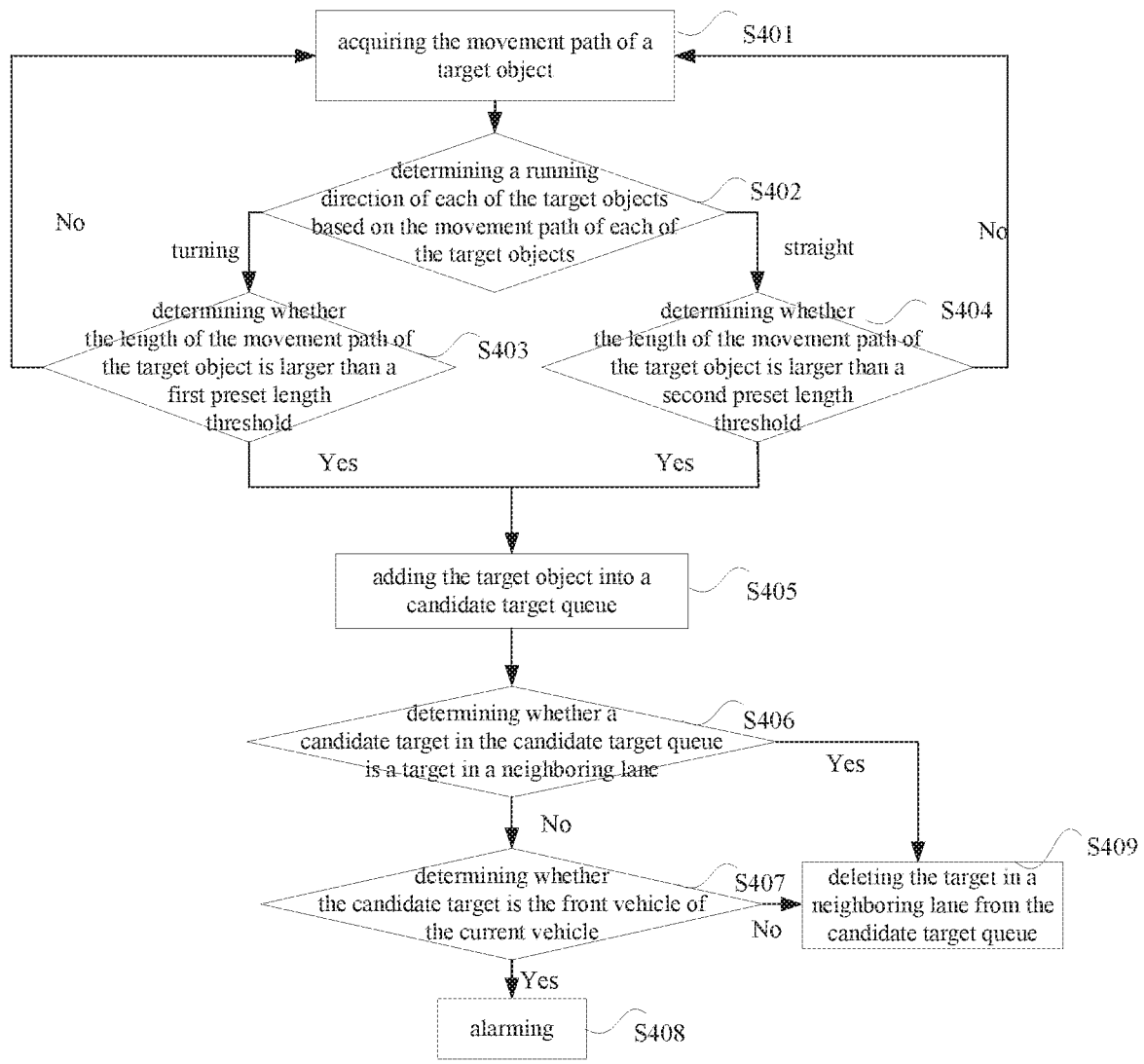
FIG. 4 is a flowchart of a third optional method for processing startup of a preceding vehicle according to an embodiment of the present application.

The above embodiments of the present application will be described in detail below in conjunction with FIG. 4. As shown in FIG. 4, the embodiment can be implemented by the following steps:

S401: acquiring the movement path of a target object.

S402: determining a running direction of each of the target objects based on the movement path of each of the target objects;

if the running direction of the target object is turning, performing S403; if the running direction of the target object is straight, performing S404;

specifically, if the curvature of the fitted curve of the movement path of the target object is larger than a preset curvature threshold value, the running direction of the target object is determined to be turning; and if the curvature of the fitted curve of the movement path of the target object is not larger than the preset curvature threshold value, the running direction of the target object is determined to be straight.

S403: determining whether the length of the movement path of the target object is larger than a first preset length threshold.

determining a target object as a candidate target that is moving if the length of the movement path of the target object is larger than a first preset length threshold.

S404: determining whether the length of the movement path of the target object is larger than a second preset length threshold;

determining a target object as a candidate target that is moving if the length of the movement path of the target object is larger than the second preset length threshold.

S405: adding the target object into a candidate target queue;

specifically, adding the target object that is determined as a candidate target that is moving into the candidate target queue.

S406: determining whether a candidate target in the candidate target queue is a target in a neighboring lane;

wherein, the target in a neighboring lane is a target that is running in a different lane from the current vehicle;

if the candidate target is the target in a neighboring lane, then performing S409: deleting the target in a neighboring lane from the candidate target queue to obtain an updated candidate target queue; otherwise, performing S407.

S407: determining whether the candidate target is the front vehicle of the current vehicle;

determining whether the candidate target in the updated candidate target queue is the front vehicle, if so, it is determined that the front vehicle of the current vehicle is moving, then performing S408.

S408: alarming.

Determining whether each of the candidate targets in the candidate target queue is a target in a neighboring lane in the above embodiments of the present application includes: detecting the lane line in the images in front of the vehicle head; when the lane line is detected, determining whether the candidate target is running in the same lane as the current vehicle, and determining, if the candidate target is running in the same lane as the current vehicle, the candidate target is not the target in a neighboring lane; when no lane line is detected, determining whether the candidate target conforms to the running path of the vehicle in a neighboring lane based on the position of the candidate target in the images in front of the vehicle head and the movement path of the candidate target; determining the candidate target is a target in a neighboring lane if the candidate target conforms to the movement path of the candidate target; determining the candidate target is not a target in a neighboring lane if the candidate target does not conform to the movement path of the candidate target.

Optionally, the lane line detection is adopted to determine whether a candidate target is in the same lane as the current vehicle, so as to filter out false triggering caused by startup of a vehicle in a neighboring lane. The lane line detection includes four steps, i.e., line segment detection, line segment integration, lane line screening and lane line tracking, wherein the line segment detection uses LSD algorithm.

Based on the above embodiments, a lane line in the images in front of the vehicle head is detected, and in two cases where a valid lane line or no valid lane line is detected, whether each of the candidate targets in a candidate target queue is a target in a neighboring lane is determined and the target in a neighboring lane is deleted from the candidate target queue to obtain an updated candidate target queue, so as to filter out incorrect reminder caused by startup of a vehicle in a neighboring lane.

Figure 5:
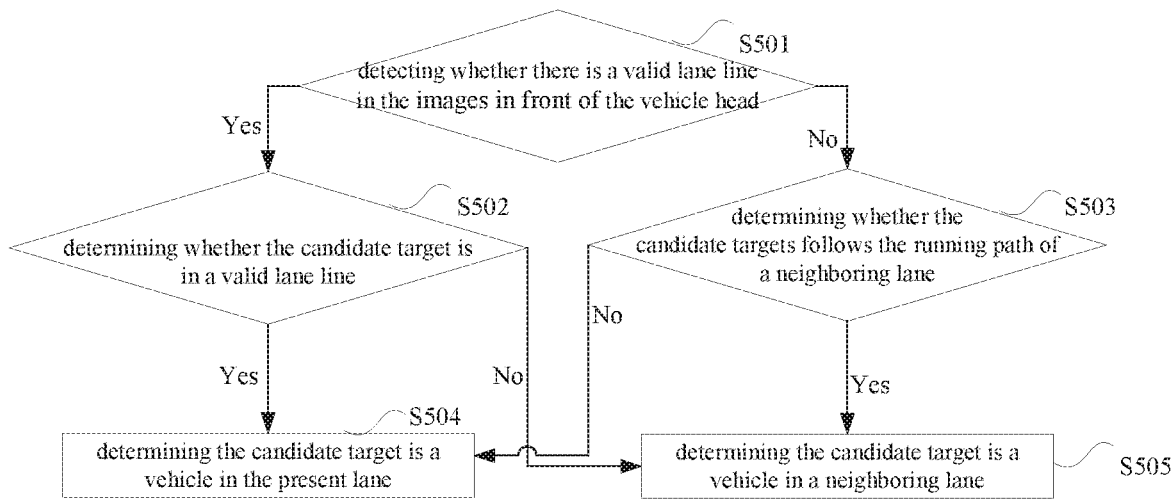
FIG. 5 is a flowchart of a fourth optional method for processing startup of a preceding vehicle according to an embodiment of the present application.

The determination procedure of a vehicle in a neighboring lane in the above embodiments of the present application will be described in detail below in conjunction with FIG. 5. As shown in FIG. 5, the determination procedure of a vehicle in a neighboring lane can be implemented by the following steps:

S501: detecting whether there is a valid lane line in the images in front of the vehicle head;

if a valid lane line is detected, performing S502; otherwise, performing S503.

S502: determining whether the candidate target is in a valid lane line;

specifically, determining whether the candidate target is running in the same lane as the current vehicle, if the candidate target is running in the same lane as the current vehicle, the candidate target is not a target in a neighboring lane, then performing S504: determining the candidate target is a vehicle in the present lane, otherwise, performing S505: determining the candidate target is a vehicle in a neighboring lane.

Wherein, the vehicle in the present lane refers to a candidate target in the same lane as the current vehicle, a vehicle in a neighboring lane refers to a candidate target not in the same lane as the current vehicle.

S503: determining whether the candidate target conforms to the running path of the vehicle in a neighboring lane;

specifically, determining whether the candidate target conforms to the running path of the vehicle in a neighboring lane based on the position of the candidate target in the images in front of the vehicle head and the movement path of the candidate target;

if the candidate target conforms to the running path of the vehicle in a neighboring lane, performing S505; otherwise, performing S504.

Determining whether a candidate target in the updated candidate target queue is a front vehicle of the current vehicle in the above embodiments of the present application includes: determining whether a candidate target is the preceding vehicle based on initial positions of the candidate targets and positions of the candidate targets relative to each other in the updated candidate target queue.

Specifically, determining whether a candidate target is the front vehicle based on the initial positions of the candidate targets and positions of the candidate targets relative to each other in the updated candidate target queue can include: determining a candidate target with a shortest distance to the midpoint of a lower edge of the images in front of the vehicle head as the preceding vehicle based on the initial positions of the candidate targets and positions of the candidate targets relative to each other in the updated candidate target queue.

Specifically, after obtaining the updated candidate target queue, obtaining the initial positions of the candidate targets and positions of the candidate targets relative to each other in the updated candidate target queue, and determining a candidate target with a shortest distance to the midpoint of a lower edge of the images in front of the vehicle head as the front vehicle of the current vehicle by analysis, if it is determined that the front vehicle of the current vehicle is moving, then generate a reminder for reminding the current vehicle to startup to remind the current vehicle to move in time; if no valid candidate target is obtained by analysis, thus there is no front vehicle that is moving in the candidate target queue, then update the movement path of the next frame of image.

Optionally, it is possible to remind the driver of the current vehicle through voices or images output by an alerting device and/or through the change of lights, such as the change of an atmosphere lamp in the vehicle at night.

Based on the above embodiments, it is possible to accurately determine whether a candidate target in an updated candidate target queue is the front vehicle of the current vehicle, and when there is a candidate target that is determined as the front vehicle of the current vehicle, it is determined that the front vehicle of the current vehicle is moving, then generate a reminder for reminding the current vehicle to startup to remind the current vehicle to move in time.

Specifically, the method for processing startup of a preceding vehicle in the embodiments of the present application is based on a gravity sensor and monocular vision. Wherein the monocular vision refers to that information of a scene in front of a vehicle head can be acquired by a camera and intelligently analyzed. The running state of the current vehicle can be accurately determined using state machine models and multi-feature fusion based on image features in the images in front of the vehicle head of the current vehicle obtained by a camera and acceleration information acquired by a gravity sensor. When the running state of the current vehicle is determined as in the stationary state, vehicle tail detection is performed on each of the images in front of the vehicle head using different vehicle tail detection models during different detection time periods to obtain one or more target objects in the images in front of the vehicle head, and each of the target objects is tracked to obtain the movement path of each of the target objects. Vehicles in a neighboring lane in the target objects are filtered out through lane line detection results to filter out incorrect reminder for the current vehicle caused by startup of a vehicle in a neighboring lane. After vehicles in a neighboring lane are filtered out, determine whether there is a front vehicle of the current vehicle in the remaining target objects, if so, generate a reminder to remind the current vehicle to move in time.

During the above lane line detection, when no valid lane line is detected, determine whether the candidate target conforms to the movement path of a vehicle in a neighboring lane based on the position of the candidate target in the images in front of the vehicle head and the movement path of the candidate target, if so, determine the candidate target as a vehicle in a neighboring lane and delete this candidate target.

Based on the above embodiments, the running state of the current vehicle is accurately determined based on both images in front of the vehicle head and acceleration information. When the running state of the current vehicle is a stationary state, determining whether the preceding vehicle of the current vehicle is started-up based on the movement path of the target object in the images in front of the vehicle head to determine whether to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

It should be noted that for simple description, the above method embodiments are expressed as a combination of a series of actions. However, a person skilled in the art should be appreciated that the present application is not limited by the order of actions described since some steps can be performed in other orders or simultaneously in the present application. Second, a person skilled in the art should also be appreciated that all the embodiments described in the description are preferable embodiments, and the actions and modules involved are not necessarily required in the present application.

Through the above description of implementations, a person skilled in the art can clearly appreciate that the method in the above embodiments can be implemented by software and necessary general hardware platforms, or by hardware, in most cases, the former is better. Based on this understanding, the essence or the part, that makes a contribution to prior art, of technical solutions in the present application can be reflected in the form of a software product, which is stored in a storage medium (such as ROM/RAM, a magnetic disk, an optical disk), including some instructions that enable a terminal equipment (e.g., a mobile phone, a computer, a server, or a network device) to implement the method in the embodiments of the present application.

Embodiment 2

Figure 6:
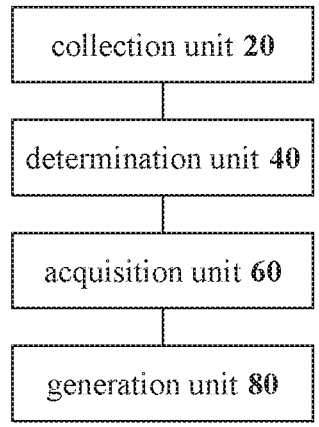
FIG. 6 is a schematic diagram of a device for processing startup of a preceding vehicle according to an embodiment of the present application.

Embodiments of the present application further provide a processing device for a method for processing startup of a preceding vehicle. The processing device is applicable to a system for processing startup of a preceding vehicle, the system includes a video sensor and a gravity sensor. As shown in FIG. 6, the device includes a collection unit 20, a determination unit 40, an acquisition unit 60 and a generation unit 80.

Wherein, the collection unit 20 is configured for collecting images in front of a vehicle head of a current vehicle by the video sensor and collecting acceleration information of the current vehicle by the gravity sensor.

The determination unit 40 is configured for determining a running state of the current vehicle based on image features in the images in front of the vehicle head and/or the acceleration information.

Wherein, the running state of a current vehicle can be in a stationary state or a moving state, the stationary state refers to a state where the current vehicle is stationary relative to the road surface, e.g., when waiting for traffic lights or in traffic jams; the moving state refers to a state where the current vehicle is moving relative to the road surface, including acceleration, deceleration, uniform motions.

The acquisition unit 60 is configured for acquiring a movement path of a target object in the images in front of the vehicle head when the running state of the current vehicle is a stationary state.

Wherein, there can be one or more target objects in the images in front of the vehicle head.

The generation unit 80 is configured for determining whether to generate a reminder for reminding the current vehicle to startup based on the movement path of the target object.

The solution of this embodiment of the present application includes: determining the running state of a current vehicle based on image features in images in front of a vehicle head collected by a video sensor and/or the acceleration information collected by a gravity sensor; acquiring a movement path of a target object in the images in front of the vehicle head when the running state of the current vehicle is a stationary state; and determining whether to generate a reminder for reminding the current vehicle to startup based on the movement path of the target object. Based on the above embodiments, the running state of a current vehicle is accurately determined based on both images in front of the vehicle head and acceleration information. When the running state of the current vehicle is a stationary state, whether the preceding vehicle of the current vehicle starts-up is determined based on the movement path of the target object in the images in front of the vehicle head to determine whether it is needed to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

In the above embodiments, successive images can be captured for an area in front of the vehicle head of the current vehicle in real time by a camera installed on a windshield behind rear view mirrors of the current vehicle to acquire images in front of a vehicle head of the current vehicle. The gravity sensor acquires acceleration information of the current vehicle in real time, the acceleration information includes acceleration values of the current vehicle in three different directions in a world coordinate system, wherein, the three different directions are a vehicle running direction, a direction perpendicular to the vehicle running direction and parallel to the road surface, and a direction perpendicular to the road surface respectively.

The running state of the vehicle can be determined more accurately by acquiring the images in front of the vehicle head and the acceleration information without modifying vehicle lines than the solution that the running state of the vehicle is only determined by a gravity sensor.

Optionally, there can be one camera in the above embodiment, a plurality of successive images are captured for an area in front of the vehicle head of the current vehicle in real time by one camera, and the acceleration information of the current vehicle is acquired by a gravity sensor. The running state of the current vehicle is determined based on image features in the images in front of the vehicle head and/or the acceleration information. If the determined running state of the current vehicle is the stationary state, acquire the movement paths of one or more target objects in the images in front of the vehicle head, and determine whether the preceding vehicle of the current vehicle has driven out based on the movement paths of one or more target objects, and if the preceding vehicle has driven out but the current vehicle is still in a stationary state, then generate a reminder.

The determination unit in the above embodiment of the present application includes: a first determination module configured for determining whether the running state of the current vehicle is a stationary state or a moving state based on frame difference foreground ratios of N successive frames of images in front of the vehicle head and/or the acceleration information of the current vehicle when the running state of the current vehicle is an initial state; a second determination module configured for determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state, Wherein, the image features in the images in front of the vehicle head include the frame difference foreground ratios and the frame difference foreground dispersions, where the frame difference foreground ratio refers to the ratio of the number of frame difference foreground points to the number of pixels of an image, the frame difference foreground dispersion refers to the ratio of the area of foreground blocks to the number of pixels of an image, and is used to measure the dispersion level of foreground scenes. Wherein, the foreground block is a rectangular block that is obtained by performing erosion, expansion, and connected domain processing on frame difference foreground points.

The acceleration information acquired by the gravity sensor in the above embodiment includes acceleration values, which can accurately reflect whether the current vehicle is in an acceleration or deceleration state. When the current vehicle starts-up or stops, the acceleration value is larger, and when the current vehicle is moving at a constant speed or still at rest, the acceleration value is smaller.

In the above embodiment, the parameter of the frame difference foreground dispersion of scenes in front of a vehicle is used when determining the running state of the current vehicle, which can remove the interference of a vehicle in a neighboring lane to the determination of the running state of the current vehicle.

Based on the above embodiments, the running state of the current vehicle is determined based on image features in images in front of a vehicle head and/or acceleration information of the current vehicle, so as to accurately determine the running state of the current vehicle.

Specifically, determining whether the running state of the current vehicle is a stationary state or a moving state based on frame difference foreground ratios of N successive frames of images in front of the vehicle head and/or the acceleration information of the current vehicle when the running state of the current vehicle is an initial state includes: determining the running state of the current vehicle is the moving state if the frame difference foreground ratios of N successive frames of images in front of the vehicle head are larger than a preset ratio threshold or the acceleration value of the current vehicle corresponding to each of the images in front of the vehicle head in N successive frames of images in front of the vehicle head is larger than a preset acceleration threshold, wherein, the acceleration information includes the acceleration value; determining the running state of the current vehicle is the stationary state if the frame difference foreground ratios of N successive frames of images in front of the vehicle head are not larger than the preset ratio threshold and the acceleration value of the current vehicle corresponding to each of the images in front of the vehicle head in N successive frames of images in front of the vehicle head is not larger than the preset acceleration threshold.

Wherein, the acceleration value is acceleration information collected by a gravity sensor.

Further, determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state includes: when the running state of the current vehicle is the moving state, it is determined that the running state of the current vehicle changes to a stationary state if the acceleration value of the current vehicle corresponding to each of the images in front of the vehicle head in N successive frames of images in front of the vehicle head is not larger than the preset acceleration threshold and frame difference foreground ratios of N successive frames of images in front of the vehicle head are not larger than the preset ratio threshold; or it is determined that the running state of the current vehicle changes to a stationary state if the acceleration value of the current vehicle corresponding to each of the images in front of the vehicle head in N successive frames of images in front of the vehicle head is not larger than the preset acceleration threshold and frame difference foreground dispersions of N successive frames of images in front of the vehicle head are not larger than the preset dispersion threshold; otherwise, it is determined the running state of the current vehicle is a moving state. When the running state of the current vehicle is a stationary state, it is determined the running state of the current vehicle changes to a moving state if the acceleration value of the current vehicle corresponding to each of the images in front of the vehicle head in N successive frames of images in front of the vehicle head is larger than a preset acceleration threshold, otherwise, it is determined the running state of the current vehicle remains in a stationary state.

The acquisition unit in the above embodiment of the present application includes: a vehicle tail detection module for performing vehicle tail detection on the images in front of the vehicle head to obtain one or more target objects in the images in front of the vehicle head; a target tracking module for performing target tracking on each of the detected target object to obtain the movement path of each of the target objects.

Specifically, performing vehicle tail detection on the images in front of the vehicle head includes: performing vehicle tail detection on the images in front of the vehicle head using different vehicle tail detection models during different detection time periods.

Optionally, when the running state of the current vehicle is the stationary state, perform vehicle tail detection on the current images in front of the vehicle head of the current vehicle collected by a camera, otherwise, stop vehicle tail detection.

In this embodiment, the vehicle tail detection module adopts an off-line learning method to train two vehicle tail models of two detection time periods (such as day and night detection periods) respectively, wherein the vehicle tail model is obtained by extracting HOG features of vehicle tail samples and training with the Adaboost algorithm. During vehicle tail detection, when in the daytime, a daytime vehicle tail model obtained by training is used, and at night, it is adaptively switched to a night vehicle tail model, which enables to use different models in different time periods and ensures the application of the method for processing startup of a preceding vehicle at night.

Optionally, the vehicle tail detection module adopts a specific scale factor to down sample the images in front of the vehicle head with to obtain a down sampled image (optionally, corresponding thumbnails are generated from the down sampled images, which improves the processing speed of the system), each down sampled image is scanned by a sliding window to calculate the match degree between each sliding window image and the trained vehicle tail model, a window with the highest match degree is output as a target object to obtain one or more target objects in the images in front of the vehicle head, and target tracking is performed on the obtained one or more target objects. Wherein, the specific scale factor can be a value set in advance.

The target tracking module enables to track a plurality of target objects at the same time using a color-based target tracking algorithm ColorCSK. The ColorCSK algorithm takes colors as image features and achieves fast correlation matching using the frequency domain. This algorithm includes two parts, i.e., model establishment and match tracking: during model establishment, positions of vehicle tails of target objects are taken as training samples, and target model parameters in the frequency domain are updated according to expected response; during match tracking, correlation matching is performed on a target object using the existing vehicle tail model to find and output the position with the highest response as the track position of the target object in the current image.

Optionally, during target tracking, due to the fact that the distance between the same target object and the current vehicle is different, the size of the image formed in different images can be different, the ColorCSK algorithm allows for scale adapting, in which multiple tracking models can be maintained to stably and continuously track one target object (e.g., a vehicle) to obtain the tracking path of each of the target objects.

When the running state of the current vehicle is the moving state, stop target tracking.

The generation unit in the above embodiment of the present application includes: a judgment module for determining whether a front vehicle of the current vehicle is moving based on the movement path of each of target objects; a generation module for generating a reminder for reminding the current vehicle to startup if the front vehicle of the current vehicle is moving, wherein, the front vehicle is a vehicle that is running in the same lane as the current vehicle and is in front of the vehicle head of the current vehicle.

Specifically, the judgment module includes: a determination submodule for determining the running direction of each of the target objects based on the movement path of each of the target objects; a first judgment submodule for determining whether the target object is a candidate target that is moving based on the running direction of the target object and the length of the movement path to obtain a candidate target queue; a second judgment submodule for determining whether each of the candidate targets in the candidate target queue is a target in a neighboring lane, wherein the target in a neighboring lane is a target that is running in a different lane from the current vehicle; a deletion submodule for deleting, if the candidate target is a target in a neighboring lane, the target in a neighboring lane from the candidate target queue to obtain an updated candidate target queue; a third judgment submodule for determining whether the candidate target in the updated candidate target queue is the front vehicle of the current vehicle; a fourth judgment submodule for determining the front vehicle of the current vehicle is moving if the candidate target in the updated candidate target queue is the front vehicle of the current vehicle.

Specifically, when the running state of the current vehicle is in the stationary state, movement paths of one or more target objects are obtained through vehicle tail detection and target tracking, the running direction (turning or straight) of each of the target objects is determined based on the movement path of each of the target objects, and then whether the target object is a candidate target that is moving is determined using the movement path of the target object and a preset judging condition corresponding to the running direction to obtain a candidate target queue. Determine whether each of the candidate targets in the candidate target queue is running in the same lane as the current vehicle, and if not, the candidate target is a target in a neighboring lane, then delete this candidate target from the candidate target queue to obtain an updated candidate target queue, and then determine whether the candidate target in the updated candidate target queue is the front vehicle of the current vehicle, if it is the front vehicle of the current vehicle, it is determined that the front vehicle of the current vehicle is moving, then generate a reminder for reminding the current vehicle to startup, wherein the front vehicle refers to a vehicle that is running in the same lane as the current vehicle and is in front of the vehicle head of the current vehicle.

Based on the above embodiments, whether the front vehicle of the current vehicle is moving is determined based on the movement path of each of the target objects, and if so, generate a reminder for reminding the current vehicle to startup, to remind the current vehicle to move in time.

The first determination submodule includes: if the curvature of the fitted curve of the movement path of the target object is larger than a preset curvature threshold value, the running direction of the target object is determined to be turning; and if the curvature of the fitted curve of the movement path of the target object is not larger than the preset curvature threshold value, the running direction of the target object is determined to be straight.

The first judgment submodule includes: determining a target object as a candidate target that is moving if the running direction of the target object is turning and the length of the movement path of the target object is larger than a first preset length threshold; determining a target object as a candidate target that is moving if the running direction of the target object is straight and the length of the movement path of the target object is larger than a second preset length threshold.

The second judgment submodule includes: detecting the lane line in the images in front of the vehicle head; when the lane line is detected, determining whether the candidate target is running in the same lane as the current vehicle, and determining, if the candidate target is not running in the same lane as the current vehicle, the candidate target is not a target in a neighboring lane; when no lane line is detected, determining whether the candidate target conforms to the running path of the vehicle in a neighboring lane based on the position of the candidate target in the images in front of the vehicle head and the movement path of the candidate target; if the candidate target conforms to the running path of the vehicle in a neighboring lane, determining the candidate target is a target in a neighboring lane; determining the candidate target is not a target in a neighboring lane if the candidate target does not conform to the movement path of the candidate target.

The third judgment submodule includes: determining whether a candidate target is the front vehicle based on initial positions of the candidate targets and positions of the candidate targets relative to each other in the updated candidate target queue. Specifically, the third judgment submodule determines, as the front vehicle, the candidate target with a shortest distance to the midpoint of a lower edge of the images in front of the vehicle head based on the initial positions of the candidate targets and positions of the candidate targets relative to each other in the updated candidate target queue.

Specifically, the method for processing startup of a preceding vehicle in the embodiments of the present application is based on a gravity sensor and monocular vision. Wherein the monocular vision refers to that information of a scene in front of a vehicle head can be acquired by one camera and intelligently analyzed. The running state of the current vehicle can be accurately determined using state machine models and multi-feature fusion based on image features in the images in front of the vehicle head of the current vehicle obtained by one camera and acceleration information acquired by a gravity sensor. When the running state of the current vehicle is determined as the stationary state, vehicle tail detection is performed on each of the images in front of the vehicle head using different vehicle tail detection models during different detection time periods to obtain one or more target objects in the images in front of the vehicle head, and each of the target objects is tracked to obtain the movement path of each of the target objects. Vehicles in a neighboring lane in the target objects are filtered out through lane line detection results to filter out incorrect reminder for the current vehicle caused by startup of a vehicle in a neighboring lane. After vehicles in a neighboring lane are filtered out, determine whether there is a front vehicle of the current vehicle in the remaining target objects, if so, generate a reminder to remind the current vehicle to move in time.

During the above lane line detection, when no valid lane line is detected, determine whether the candidate target conforms to the movement path of a vehicle in a neighboring lane based on the position of the candidate target in the images in front of the vehicle head and the movement path of the candidate target, if so, determine the candidate target as the vehicle in a neighboring lane and delete this candidate target.

Based on the above embodiments, the running state of the current vehicle is accurately determined based on both images in front of the vehicle head and acceleration information. When the running state of the current vehicle is a stationary state, whether the preceding vehicle of the current vehicle starts-up is determined based on the movement path of the target object in the images in front of the vehicle head to determine whether to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

Various modules provided in the present embodiment correspond to corresponding steps of the method embodiments with the same application scenes. Of course, it should be noted that the solutions involved in the above module may not be limited to the content and scenes in the above embodiments, and the above modules can be executed on a computer terminal or a mobile terminal, or can be implemented by software or hardware.

Embodiment 3

Figure 7:
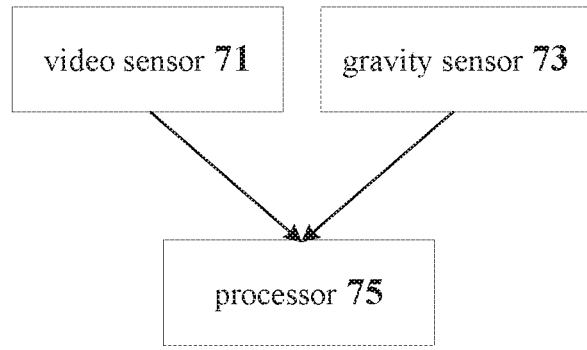
FIG. 7 is a schematic diagram of a system for processing startup of a preceding vehicle according to an embodiment of the present application.

Embodiments of the present application further provide a system for processing startup of a preceding vehicle. As shown in FIG. 7, the processing system can include: a video sensor 71, gravity sensor 73 and a processor 75.

Wherein, the video sensor 71 is installed on a front windshield of the current vehicle, and the camera is located on the same horizontal line with the rear view mirror of the current vehicle to collect images in front of the vehicle head of the current vehicle.

The gravity sensor 73 is configured for collecting acceleration information of the current vehicle by the gravity sensor.

The processor 75 is connected to the video sensor 71 and the gravity sensor 73, and is configured for determining the running state of the current vehicle based on image features in the images in front of the vehicle head and/or the acceleration information, acquiring a movement path of a target object in the images in front of the vehicle head when the running state of the current vehicle is a stationary state; and determining whether to generate a reminder for reminding the current vehicle to startup based on the movement path of the target object.

Based on the above embodiments of the present application, images in front of a vehicle head of a current vehicle is collected by a video sensor installed on the front windshield of the current vehicle and acceleration information of the current vehicle is collected by a gravity sensor; the running state of the current vehicle is determined based on image features in the images in front of the vehicle head and/or the acceleration information; a movement path of a target object in the images in front of the vehicle head is acquired when the running state of the current vehicle is a stationary state; and whether to generate a reminder for reminding the current vehicle to startup is determined based on the movement path of the target object.

In the above embodiments, a video sensor can be used to capture image information of the scene in front of the vehicle head of the current vehicle, wherein the reminding of startup of the preceding vehicle is performed based on a gravity sensor and a monocular, which improves the accuracy of reminding.

Figure 8:
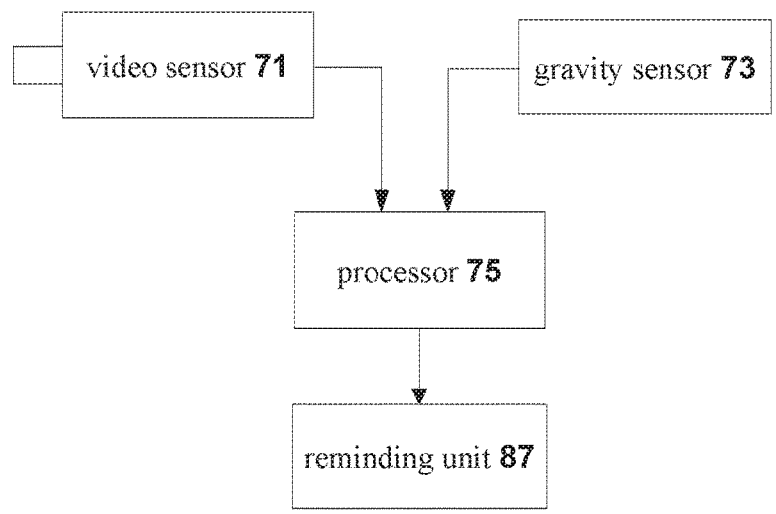
FIG. 8 is a schematic diagram of an optional system for processing startup of a preceding vehicle according to an embodiment of the present application.

As in the above embodiment of the present application as shown in FIG. 8, the processing system can further include: a reminding unit 87 for outputting a reminder in sounds and/or images.

The video sensor in the above embodiments of the present application can be implemented by a camera, and the reminding unit above can be an alarming unit.

In the above embodiments of the present application, images in front of the vehicle head of a current vehicle is collected by a camera 81, and the acceleration information of the current vehicle is collected by a gravity sensor 83, the running state of the current vehicle is determined by a processor 85 based on image features in the collected images in front of the vehicle head and/or the acceleration information; if the running state of the current vehicle is a stationary state, acquire the movement path of a target object in the images in front of the vehicle head, and determine whether to generate a reminder for reminding the current vehicle to startup based on the movement path of the target object; if a reminder is generated, the driver of the current vehicle can be reminded by sounds or images output by the reminding unit 87 (e.g., an alarming unit) or by the change of lights.

Figure 9:
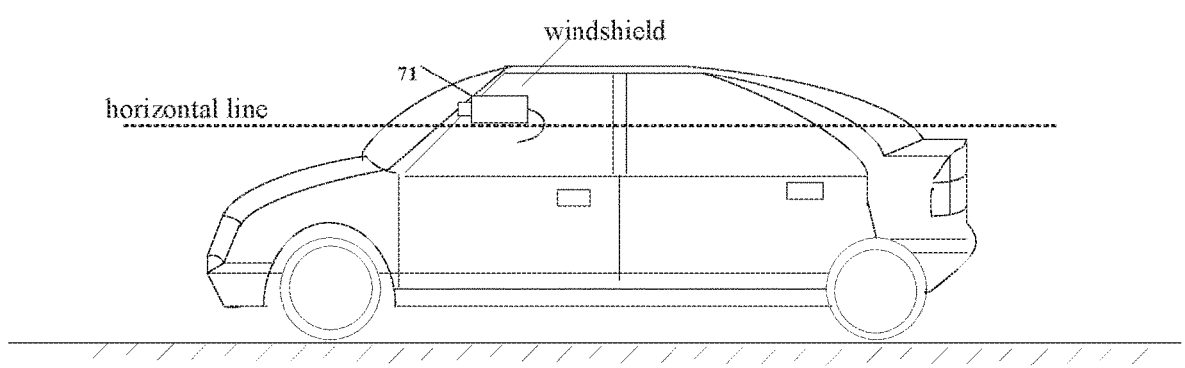
FIG. 9 is a schematic diagram of another optional system for processing startup of a preceding vehicle according to an embodiment of the present application.

Optionally, the system for reminding startup of a preceding vehicle includes a video sensor, a gravity sensor, a processor and a reminding unit, and the system is installed on a windshield behind rear view mirrors of the current vehicle, wherein the video sensor (e.g., a camera) remains horizontal, this camera can be located on the same horizontal line with a rear view mirror of the current vehicle, the installation diagram is shown in FIG. 9.

Based on the above embodiments, the running state of a current vehicle is accurately determined based on both images in front of the vehicle head and acceleration information of the current vehicle. When the running state of the current vehicle is a stationary state, whether the preceding vehicle of the current vehicle is started-up is determined based on the movement path of the target object in the images in front of the vehicle head to determine whether it is needed to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

Embodiments of the present application provide an application, which is configured for implementing the method for processing startup of a preceding vehicle when being carried out. The method can include:

collecting images in front of a vehicle head of a current vehicle by the video sensor and collecting acceleration information of the current vehicle by the gravity sensor;

determining a running state of the current vehicle based on image features in the images in front of the vehicle head and/or the acceleration information;

acquiring a movement path of a target object in the images in front of the vehicle head when the running state of the current vehicle is a stationary state; and determining whether to generate a reminder for reminding the current vehicle to startup based on the movement path of the target object.

The solution of this embodiment of the present application includes: determining the running state of a current vehicle based on image features in images in front of a vehicle head collected by a video sensor and/or the acceleration information collected by a gravity sensor; acquiring a movement path of a target object in the images in front of the vehicle head when the running state of the current vehicle is a stationary state; and determining whether to generate a reminder for reminding the current vehicle to startup based on the movement path of the target object. Based on the above embodiments, the running state of a current vehicle can be accurately determined based on both images in front of the vehicle head and acceleration information. When the running state of the current vehicle is a stationary state, whether the preceding vehicle of the current vehicle starts-up is determined based on the movement path of the target object in the images in front of the vehicle head to determine whether it is needed to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

Embodiments of the present application provide a storage medium, which is configured for storing an application configured for implementing the method for processing startup of a preceding vehicle when being carried out, the method can include:

collecting images in front of a vehicle head of a current vehicle by the video sensor and collecting acceleration information of the current vehicle by the gravity sensor;

determining a running state of the current vehicle based on image features in the images in front of the vehicle head and/or the acceleration information;

acquiring a movement path of a target object in the images in front of the vehicle head when the running state of the current vehicle is a stationary state; and determining whether to generate a reminder for reminding the current vehicle to startup based on the movement path of the target object.

The solution of this embodiment of the present application includes: determining the running state of a current vehicle based on image features in images in front of a vehicle head collected by a video sensor and/or the acceleration information collected by a gravity sensor; acquiring a movement path of a target object in the images in front of the vehicle head when the running state of the current vehicle is a stationary state; and determining whether to generate a reminder for reminding the current vehicle to startup based on the movement path of the target object. Based on the above embodiments, the running state of a current vehicle can be accurately determined based on both images in front of the vehicle head and acceleration information. When the running state of the current vehicle is a stationary state, whether the preceding vehicle of the current vehicle starts-up is determined based on the movement path of the target object in the images in front of the vehicle head to determine whether it is needed to generate a reminder. In this solution, fewer parameters are used in the processing process and the processing result is accurate, which solves the problem that it is impossible to give an accurate reminder that the preceding vehicle has started-up during driving in the prior art, such that when the front vehicle of the current vehicle drives out, it can promptly remind the current vehicle to move in time.

For the embodiments of the system, the application program, and the storage medium for processing startup of a preceding vehicle, since they are basically similar to the method embodiments, the descriptions are relatively simple. For related parts, reference may be made to the partial description of the method embodiments.

The sequence numbers of the above embodiments of the present application are only for the description and do not represent the advantages and disadvantages of the embodiments.

In the above embodiments of the present application, the descriptions of various embodiments focus on different aspects. For the part that is not described in detail in an embodiment, references can be made to the related descriptions of other embodiments.

In some embodiments provided in the present application, it should be understood that the disclosed technical content can be realized in other ways. Wherein, the device embodiments described above are only illustrative. For example, units can be divided according to logic functions and there can be other division ways in actual implementations. For example, a plurality of units or components can be combined or integrated into another system, or some features can be ignored, or do not be implemented. On the other hand, the coupling or direct coupling or communicative connection that is shown or discussed can be indirectly coupling or communicative connection by some interfaces, units or modules, which can be electrical or other forms.

The units described as separated components may or may not be physically separated, the components displayed as a unit may or may not be a physical unit, i.e., may be located in one place, or can be distributed in a plurality of network units. The objectives of the solutions of the present embodiments can be realized by selecting a part or all modules thereof according to practical needs.

Besides, various functional units in various embodiments of the present application can be integrated into one processing unit, or various units can physically exist alone, or two or more than two units are integrated into one unit. The integrated units above can be implemented either in the form of hardware or in the form of a software functional unit.

The integrated unit can be stored in a computer readable storage medium if it is implemented in the form of software functional unit and sold or used as an independent product. Based on this understanding, the essence or the part, that makes a contribution to prior art, of technical solutions, or all or a part of the technical solutions in the present application can be reflected in the form of a software product, which is stored in a storage medium, including some instructions that enable a computer device (e.g., a personal computer, a server, or a network device) to perform all or a part of the steps of the method in various embodiments of the present application. The storage medium described above includes various media capable of storing program codes, such as a U disk, a read-only memory (ROM), a random access memory (RAM), a mobile hard disk, a magnetic disk or an optical disk.

The above description is only a preferred embodiments of the present application, and it should be noted that improvements and modifications can be made by those of ordinary skill in the art without departing from the principles of the present application and the improvements and modifications should be deemed as the protection scope of the present application.

The invention claimed is:

1. A method for processing startup of a preceding vehicle, which is applicable in a system for processing startup of a preceding vehicle, the system comprises a video sensor and a gravity sensor; the method comprises:
   collecting images in front of a vehicle head of a current vehicle by the video sensor and collecting acceleration information of the current vehicle by the gravity sensor;
   determining a running state of the current vehicle based on image features in the images in front of the vehicle head and/or the acceleration information;
   acquiring a movement path of a target object in the images in front of the vehicle head when the running state of the current vehicle is a stationary state; and
   determining whether to generate a reminder for reminding the current vehicle to startup based on the movement path of the target object,
   wherein the step of determining the running state of the current vehicle further comprises:
   determining whether the running state of the current vehicle is the stationary state or a moving state based on frame difference foreground ratios of N successive frames of images in front of the vehicle head and/or the acceleration information of the current vehicle when the running state of the current vehicle is an initial state;
   determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state;
   wherein, the image features in the images in front of the vehicle head comprise the frame difference foreground ratios and the frame difference foreground dispersion.

2. The method of claim 1, wherein, determining whether the running state of the current vehicle is the stationary state or a moving state based on frame difference foreground ratios of N successive frames of images in front of the vehicle head and/or the acceleration information of the current vehicle when the running state of the current vehicle is an initial state comprises:
   determining the running state of the current vehicle is the moving state if the frame difference foreground ratios of N successive frames of images in front of the vehicle head are larger than a preset ratio threshold or the acceleration value of the current vehicle corresponding to each of the images in front of the vehicle head in N successive frames of images in front of the vehicle head is larger than a preset acceleration threshold, wherein, the acceleration information comprises the acceleration value;
   determining the running state of the current vehicle is the stationary state if the frame difference foreground ratios of N successive frames of images in front of the vehicle head are not larger than the preset ratio threshold and the acceleration value of the current vehicle corresponding to each of the images in front of the vehicle head in N successive frames of images in front of the vehicle head is not larger than the preset acceleration threshold.

3. The method of claim 1, wherein, determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state comprises:
   when the running state of the current vehicle is the moving state, determining that the running state of the current vehicle changes to the stationary state if the acceleration value of the current vehicle corresponding to each of the images in front of the vehicle head in N successive frames of images in front of the vehicle head is not larger than the preset acceleration threshold and the frame difference foreground ratios of N successive frames of images in front of the vehicle head are not larger than the preset ratio threshold; or determining that the running state of the current vehicle changes to the stationary state if the acceleration value of the current vehicle corresponding to each of the images in front of the vehicle head in N successive frames of images in front of the vehicle head is not larger than the preset acceleration threshold and frame difference foreground dispersions of N successive frames of images in front of the vehicle head are not larger than the preset dispersion threshold;
   when the running state of the current vehicle is the stationary state, determining that the running state of the current vehicle changes to the moving state if the acceleration value of the current vehicle corresponding to each of the images in front of the vehicle head in N successive frames of images in front of the vehicle head is larger than the preset acceleration threshold, otherwise, determining that the running state of the current vehicle remains in the stationary state.

4. The method of claim 1, wherein acquiring a movement path of a target object in the images in front of the vehicle head when the running state of the current vehicle is a stationary state comprises:
   performing vehicle tail detection on the images in front of the vehicle head to obtain one or more target objects in the images in front of the vehicle head;
   performing target tracking on each of the detected target objects to obtain the movement path of each of the target objects,
   wherein, performing vehicle tail detection on the images in front of the vehicle head comprises:
   performing vehicle tail detection on the images in front of the vehicle head by using different vehicle tail detection models during different detection time periods.

5. The method of claim 1, wherein, determining whether to generate a reminder for reminding the current vehicle to startup based on the movement path of the target object comprises:
   determining whether a preceding vehicle of the current vehicle is moving based on the movement path of each of target objects;
   generating a reminder for reminding the current vehicle to startup if the preceding vehicle of the current vehicle is moving.

6. The method of claim 5, wherein, determining whether a preceding vehicle of the current vehicle is moving based on the movement path of each of target objects comprises:
   determining a running direction of each of the target objects based on the movement path of each of the target objects;
   determining whether the target objects are candidate targets that are moving based on the running directions of the target objects and lengths of the movement paths to obtain a candidate target queue;

determining whether each of the candidate targets in the candidate target queue is a target in a neighboring lane, wherein a target in a neighboring lane is a target that is running in a different lane from the current vehicle;

if the candidate target is a target in a neighboring lane, deleting the target in a neighboring lane from the candidate target queue to obtain an updated candidate target queue;

determining whether a candidate target in the updated candidate target queue is the preceding vehicle of the current vehicle;

determining that the preceding vehicle of the current vehicle is moving if the candidate target in the updated candidate target queue is the preceding vehicle of the current vehicle.

7. The method of claim 6, wherein, determining a running direction of each of the target objects based on the movement path of each of the target objects comprises:

if curvature of the fitted curve of the movement path of a target object is larger than a preset curvature threshold, determining the running direction of the target object is turning;

if curvature of the fitted curve of the movement path of a target object is not larger than the preset curvature threshold, determining the running direction of the target object is straight.

8. The method of claim 7, wherein, determining whether the target objects are candidate targets that are moving based on the running directions of the target objects and lengths of the movement paths comprises:

determining a target object as a candidate target that is moving if the running direction of the target object is turning and the length of the movement path of the target object is larger than a first preset length threshold;

determining a target object as a candidate target that is moving if the running direction of the target object is straight and the length of the movement path of the target object is larger than a second preset length threshold.

9. The method of claim 6, wherein, determining whether each of the candidate targets in the candidate target queue is a target in a neighboring lane comprises:

detecting a lane line in the images in front of the vehicle head;

when the lane line is detected, determining whether a candidate target is running in the same lane as the current vehicle, and if the candidate targets are running in the same lane as the current vehicle, determining that the candidate target is not a target in a neighboring lane;

when no lane line is detected, determining whether a candidate target follows the running path of a neighboring lane based on position of the candidate target in the images in front of the vehicle head and the movement path of the candidate target;

determining the candidate target is a target in a neighboring lane if the candidate target follows the running path of the neighboring lane;

determining the candidate target is not a target in a neighboring lane if the candidate target does not follow the movement path of the neighboring lane.

10. The method of claim 6, wherein, determining whether a candidate target in the updated candidate target queue is a preceding vehicle of the current vehicle comprises:

determining whether a candidate target is the preceding vehicle based on initial positions of the candidate targets and positions of the candidate targets relative to each other in the updated candidate target queue.

11. The method of claim 10, wherein, determining whether a candidate target is the preceding vehicle based on initial positions of the candidate targets and positions of the candidate targets relative to each other in the updated candidate target queue comprises:

determining a candidate target with a shortest distance to the midpoint of a lower edge of the images in front of the vehicle head as the preceding vehicle based on the initial positions of the candidate targets and positions of the candidate targets relative to each other in the updated candidate target queue.

12. A device for processing startup of a preceding vehicle, which is applicable in a system for processing startup of a preceding vehicle, the system comprises a video sensor and a gravity sensor, the device comprises:

a collection unit, configured for collecting images in front of a vehicle head of a current vehicle by the video sensor and collecting acceleration information of the current vehicle by the gravity sensor;

a determination unit, configured for determining a running state of the current vehicle based on image features in the images in front of the vehicle head and/or the acceleration information;

an acquisition unit, configured for acquiring a movement path of a target object in the images in front of the vehicle head when the running state of the current vehicle is a stationary state; and a generation unit, configured for determining whether to generate a reminder for reminding the current vehicle to startup based on the movement path of the target object, wherein the determination unit comprises:

a first determination module, configured for determining whether the running state of the current vehicle is the stationary state or a moving state based on frame difference foreground ratios of N successive frames of images in front of the vehicle head and/or the acceleration information of the current vehicle when the running state of the current vehicle is an initial state;

a second determination module, configured for determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state, wherein, the image features in the images in front of the vehicle head comprise the frame difference foreground ratios and the frame difference foreground dispersion.

13. The device of claim 12, wherein the acquisition unit comprises:

a vehicle tail detection module, configured for performing vehicle tail detection on the images in front of the vehicle head to obtain one or more target objects in the images in front of the vehicle head;

a target tracking module, configured for performing target tracking on each of the detected target objects to obtain the movement path of each of the target objects.

14. The device of claim 12, wherein the generation unit comprises:

a judgment module, configured for determining whether a preceding vehicle of the current vehicle is moving based on the movement path of each of target objects;

a generation module, configured for generating a reminder for reminding the current vehicle to startup if the preceding vehicle of the current vehicle is moving.

15. The device of claim 14, wherein the judgment module comprises:
   a determination submodule, configured for determining a running direction of each of the target objects based on the movement path of each of the target objects;
   a first judgment submodule, configured for determining whether the target objects are candidate targets that are moving based on the running directions of the target objects and lengths of the movement paths to obtain a candidate target queue;
   a second judgment submodule, configured for determining whether each of the candidate targets in the candidate target queue is a target in a neighboring lane, wherein a target in a neighboring lane is a target that is running in a different lane from the current vehicle;
   a deletion submodule, configured for, if the candidate target is a target in a neighboring lane, deleting the target in a neighboring lane from the candidate target queue to obtain an updated candidate target queue;
   a third judgment submodule, configured for determining whether a candidate target in the updated candidate target queue is the preceding vehicle of the current vehicle;
   a fourth judgment submodule, configured for determining that the preceding vehicle of the current vehicle is moving if the candidate target in the updated candidate target queue is the preceding vehicle of the current vehicle.

16. A system for processing startup of a preceding vehicle, comprising:
   a video sensor installed on a front windshield of a current vehicle, wherein the video sensor is located on the same horizontal line with rear view mirror of the current vehicle and is configured for collecting images in front of the vehicle head of the current vehicle;
   a gravity sensor configured for acquiring acceleration information of the current vehicle;
   a processor that is connected to the video sensor and the gravity sensor, and configured for determining a running state of the current vehicle based on image features in the images in front of the vehicle head and/or the acceleration information, acquiring a movement path of a target object in the images in front of the vehicle head when the running state of the current vehicle is a stationary state, and determining whether to generate a reminder for reminding the current vehicle to startup based on the movement path of the target object,
   wherein the processor is further configured for:
   determining whether the running state of the current vehicle is the stationary state or a moving state based on frame difference foreground ratios of N successive frames of images in front of the vehicle head and/or the acceleration information of the current vehicle when the running state of the current vehicle is an initial state;
   determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state;
   wherein the image features in the images in front of the vehicle head comprise the frame difference foreground ratios and the frame difference foreground dispersion.

17. The system according to claim 16, wherein the system further comprises:
   a reminding unit that is connected to the processor and configured for outputting a reminder in a manner of sound and/or image.

18. A non-transitory computer-readable storage medium, which is configured for storing an application, wherein the application is configured for implementing a method for processing startup of a preceding vehicle when being carried out, wherein the method comprises:
   collecting images in-front of a vehicle head of a current vehicle by the video sensor and collecting acceleration information of the current vehicle by the gravity sensor;
   determining a running state of the current vehicle based on image features in the images in front of the vehicle head and/or the acceleration information;
   acquiring a movement path of a target object in the images in front of the vehicle head when the running state of the current vehicle is a stationary state; and
   determining whether to generate a reminder for reminding the current vehicle to startup based on the movement path of the target object,
   determining, the running state of the current vehicle based on image features in the images in front of the vehicle head and/or the acceleration information comprises:
   determining whether the running state of the current vehicle is the stationary state or a moving state based on frame difference foreground ratios of N successive frames of images in front of the vehicle head and/or the acceleration information of the current vehicle when the running state of the current vehicle is an initial state;
   determining whether the running state of the current vehicle is the stationary state or the moving state based on frame difference foreground ratios and/or frame difference foreground dispersions of N successive frames of images in front of the vehicle head and the acceleration information of the current vehicle when the running state of the current vehicle is not the initial state;
   wherein, the image features in the images in front of the vehicle head comprise the frame difference foreground ratios and the frame difference foreground dispersion.

* * * * *

UNITED STATES PATENT AND TRADEMARK OFFICE
CERTIFICATE OF CORRECTION

PATENT NO. : 10,818,172 B2  
APPLICATION NO. : 15/770280  
DATED : October 27, 2020  
INVENTOR(S) : Wei Tan et al.

Page 1 of 1

It is certified that error appears in the above-identified patent and that said Letters Patent is hereby corrected as shown below:

On the Title Page

(73) Assignee: HANGZHOU HIKVISION DIGITAL TECHNOLOGY CO., LTD.,
Hangzhou, Jhejiang (CN)

Should read:
(73) Assignee: HANGZHOU HIKVISION DIGITAL TECHNOLOGY CO., LTD.
Hangzhou, Zhejiang (CN)

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*